United States Patent [19]
Krumm, Sr.

[11] Patent Number: 5,941,349
[45] Date of Patent: *Aug. 24, 1999

[54] ARCUATE BRAKE SYSTEM WITH FASTENER-FREE, REPLACEABLE BRAKE LINING

[76] Inventor: Walter E. Krumm, Sr., 3890 NW. Gainesville Rd., Ocala, Fla. 34475

[ * ] Notice: This patent is subject to a terminal disclaimer.

[21] Appl. No.: 08/806,431

[22] Filed: Feb. 26, 1997

Related U.S. Application Data

[63] Continuation of application No. PCT/US95/10875, Aug. 28, 1995, which is a continuation-in-part of application No. 08/296,942, Aug. 26, 1994, Pat. No. 5,469,942.

[51] Int. Cl.$^6$ .................................................. F16D 69/00
[52] U.S. Cl. .................................. 188/250 G; 188/250 B
[58] Field of Search .......................... 188/250 B, 250 E, 188/250 G, 234, 238, 240, 242, 244, 245; 192/70.13, 70.19, 70.22, 76

[56] References Cited

U.S. PATENT DOCUMENTS

| | | | |
|---|---|---|---|
| Re. 24,476 | 5/1958 | Bonkowski | 188/240 |
| 1,934,448 | 11/1933 | Roth | 188/250 G |
| 2,229,922 | 1/1941 | Heinze | 188/240 |
| 2,480,947 | 9/1949 | McEachran | 188/240 |
| 2,541,978 | 2/1951 | Amundsen | 188/240 |
| 2,541,979 | 2/1951 | Amundsen | 188/240 |
| 2,647,592 | 8/1953 | Tilden | 188/2 |
| 2,722,293 | 11/1955 | Sykes | 188/234 |
| 3,138,224 | 6/1964 | White | 188/250 G |
| 3,367,458 | 2/1968 | Self et al. | 188/250 G |
| 3,467,229 | 9/1969 | Deibel | 188/250 G |
| 4,429,770 | 2/1984 | Weisbrod | 188/250 G |
| 4,867,285 | 9/1989 | Gatlin | 188/250 G |
| 5,119,909 | 6/1992 | Shim | 188/245 |
| 5,261,512 | 11/1993 | Young | 188/250 B |
| 5,429,215 | 7/1995 | King | 188/250 C |
| 5,511,636 | 4/1996 | Tanaka | 188/325 |
| 5,636,717 | 6/1997 | Cardenas | 188/250 G |

FOREIGN PATENT DOCUMENTS 2 191 834  12/1987  United Kingdom.

Primary Examiner—Chris Schwartz
Attorney, Agent, or Firm—Shlesinger, Arkwright & Garvey LLP

[57] ABSTRACT

An arcuate brake lining apparatus for use with an arcuate brake drum is disclosed that includes a brake shoe table having an inner edge and an outer edge. There is an outer lip on the outer edge of the brake shoe table. A gripper is detachably attached to the brake shoe table. An inner lip is provided on the gripper. There is at least one brake lining segment having a braking surface configured for engaging an arcuate brake drum. The at least one brake lining segment has an inner edge and an outer edge, the inner edge being configured for engaging the inner lip of the gripper, and the outer edge being configured for engaging the outer lip of the brake shoe table. In the method of using the arcuate brake lining apparatus, when the at least one brake lining segment is to be replaced, the gripper is removed from the brake shoe table, and the at least one brake lining segment is moved in a direction from the outer edge toward the inner edge for disengaging the outer edge from the outer lip.

26 Claims, 5 Drawing Sheets

ARCUATE BRAKE SYSTEM WITH FASTENER-FREE, REPLACEABLE BRAKE LINING

This application is a continuation of PCT/US95/10875 filed Aug. 28, 1995 which is a cip of application Ser. No. 08/296,942 filed Aug. 26, 1994 now U.S. Pat. No. 5,469,942.

BACKGROUND OF THE INVENTION

Conventional drum brake systems, such as used on trucks and tractor-trailer rigs, are difficult and time-consuming to work on. Accordingly, vital maintenance of the braking system is often deferred, which deferral of needed work can lead to diminished braking capacity, increased wear on the components, and the like. One reason maintenance is often deferred on conventional braking systems is that the large amount of time required for servicing the system results in undesirable and uneconomic down time of the vehicle on which the system is placed.

In addition, many conventional braking systems require replacement of bearings, seals and/or lubricants, such as when conventional brake linings are replaced. Such replacement of bearings and seals is expensive, and time consuming. The loss of lubricants, which often occurs at an off-site location when brake repairs are necessary in the field, is not only an added expense, but is also environmentally unfriendly.

Many attempts have been made to provided braking systems having easily replaced components.

U.S. Pat. No. 5,119,909 to Shim discloses a brake shoe construction having ears interfingered with a pad. Shim states that the pad can be readily removed and replaced without removing the brake pad and the shoe. Shim contemplates an optional raised ridge 130 formed on Shim pad 46 with its mating complementary groove 132 in flange 38 of shoe 20. Although Shim discloses a lug 82 which mates with recesses 86 in the embodiment of FIG. 9, Shim failed to eliminate the use of fasteners, such as a screw 56 for securing the ends of the Shim pad against any movement with respect to Shim flange 38, as shown in Shim's embodiment of FIGS. 6–9, for example.

U.S. Pat. No. 2,229,922 to Heinze discloses a shoe having dovetail sections (FIG. 5) for mating with dovetail slots of Heinze blocks (FIG. 4).

U.S. Pat. No. 4,429,770 to Weisbrod is of interest for its disclosure of a friction lining carrier member having replaceable friction linings which have angled faces.

Both the Heinze and Weisbrod patents described immediately above are apparently time-consuming to use, and lack the simplicity of the present invention.

U.S. Pat. No. 2,647,592 to Tilden discloses generally the configuration of a brake lining segment being substantially aligned with a counterpart free edge of a brake drum.

U.S. Pat. No. 3,367,458 to Self is of general interest for its disclosure of removing brake shoes without jacking the vehicle axle and without breaking the seals, as in most other conventional brake shoe assemblies.

OBJECTS AND SUMMARY OF THE INVENTION

Accordingly, it is an object of the invention to provide a brake system which overcomes the drawbacks and disadvantages of the prior art devices.

Another object of the invention is to provide a braking device which can be inexpensively manufactured.

Yet another object of the invention is to provide a braking device which can be used without the need for specialized tools.

A still further object of the invention is to provide a braking device which provides more braking force than conventional devices having the same allotted surface area for braking.

Another object of the invention is to provide a braking device in which the brake lining can be quickly replaced.

A further object of the invention is to provide a reduced-weight braking system.

Yet another object of the invention is to provide a braking device in which the brake lining can be replaced without jacking up the vehicle on which the braking device is installed, and without the removal of the wheel associated with the braking device.

A yet further object of the invention is to provide a braking device in which the brake linings can be replaced without the need to replace bearings, seals, lubricants, and/or grease fittings, for example.

A still further object of the invention is to provide a braking device in which only one wrench is needed to replace worn brake linings.

Yet another object of the invention is to provide a braking device which reduces vehicle down time.

Another object of the invention is to provide a braking device which decreases overall vehicle operating costs.

A further object of the invention is to provide a braking device which provides extended life for brake linings, as well as reduced wear on brake drum surfaces.

A still further object of the invention is to provide a braking device which offers greater stopping power by increasing the pad surface area coming into contact with the brake drum.

Another object of the invention is to provide a braking device in which the possibility of damage to the brake drums by overworn brake linings is eliminated, thanks to the elimination of fasteners in the contact region between the brake drum and the brake lining.

In summary, therefore, the invention is directed to a braking device including a brake shoe table and an outer lip disposed on the outer edge of the brake shoe table. A gripper is detachably attached to the brake shoe table. An inner lip is provided on the gripper. There is a brake lining segment having a braking surface, and the brake lining segment includes an inner edge for engaging the inner lip of the gripper and an outer edge for engaging the outer lip of the brake shoe table.

The invention further includes a method of replacing an arcuate brake lining disposed within an arcuate brake drum to provide an arcuate brake lining apparatus including a brake shoe table, said brake shoe table having an inner edge and an outer edge, an outer lip disposed on said outer edge of said brake shoe table, a gripper detachably attached to said brake shoe table, an inner lip disposed on said gripper, and at least one brake lining segment, said at least one brake lining segment having a braking surface configured for engaging an arcuate brake drum, said at least one brake lining segment having an inner edge and an outer edge, said inner edge being configured for engaging said inner lip of said gripper, and said outer edge being configured for engaging said outer lip of said brake shoe table, removing said gripper from said brake shoe table, moving said at least one brake lining segment in a direction from said outer edge toward said inner edge for disengaging said outer edge from said outer lip.

The invention will be further described with reference to the following drawings.

DETAILED DESCRIPTION OF THE INVENTION

Figure 1:
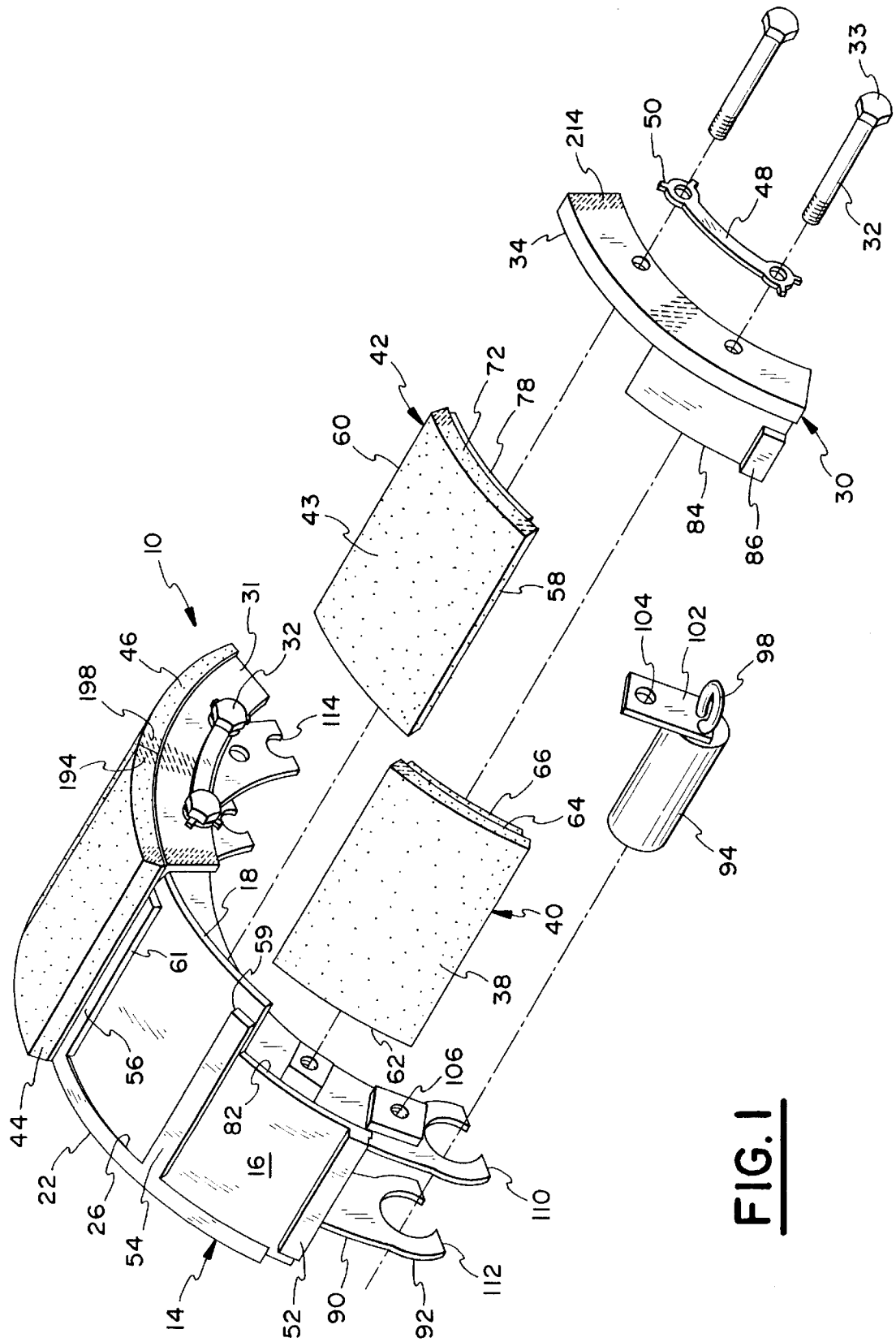
FIG. 1 is an exploded perspective view of an arcuate brake lining apparatus according to a first preferred embodiment of the invention.

FIGS. 1–4 illustrate a preferred embodiment of an arcuate brake lining apparatus 10 according to the invention. Arcuate brake lining apparatus 10 is particularly suited for use with arcuate brake drums.

Brake lining apparatus 10 includes a brake shoe table 14 defining an upper surface 16 thereon. Brake shoe table 14 likewise includes an inner edge 18 and an outer edge 22. The terms "inner" and "outer" are simply for convenience, are not intended to be limiting, and can be understood to refer to the disposition of brake lining apparatus 10 with respect to the center line of a vehicle on which the brake lining apparatus 10 is located when in use.

An outer lip 26 is provided at outer edge 22, and will be described in greater detail below with respect to FIG. 4.

One or more grippers 30 and 31 are detachably attached to brake shoe table 14, such as by one or more bolts 32. Gripper 30 may include an inner lip 34 for use in cooperation with outer lip 26 of brake shoe table 14, as will become more apparent below.

A braking surface 38 is provided on a first brake lining segment 40 in order to establish the desired braking force when in use adjacent the inner braking surface of a brake drum D.

It is likewise contemplated that a plurality of brake lining segments be provided, such as a second brake lining segment 42, a third brake lining segment 44, and a fourth brake lining segment 46.

A strap lock 48 is disposed between gripper 30 and bolt heads 33 when in use. One or more bendable tabs 50 is provided on strap lock 48. Tabs 50 may be bent transversely to strap lock 48 into engagement with a flat edge face of bolt head 33 for preventing rotation of bolt head 33 and, hence, bolt 32 relative to brake shoe table 14, whereby first and second brake lining segments 40 and 42 are retained in place on brake shoe table 14.

An outer stop 52 and a first inner stop 54 are provided adjacent upper surface 16 of brake shoe table 14. In the case where a number of brake lining segments are provided, a second inner stop 56 can be provided, for example. A substantially flat face or edge 58 of second brake lining segment 42 engages a corresponding edge or face 59 of first inner stop 54. There is likewise provided an edge or face 61 on second inner stop 56 for abutting a substantially flat or edge 60 of second brake lining segment 42.

An outer face or edge 62 of first brake lining segment 40, for example, preferably includes a wedge configured for engaging outer lip 26 of brake shoe table 14. An inner face or edge 64 of first brake lining segment 40 has an inner wedge 66 which engages inner lip 34 of gripper 30.

In the case of multiple brake lining segments, an inner edge or face 72 and an outer edge or face 74 will be provided on second brake lining segment 42. Outer edge 74 defines an outer wedge 76 for engagement with outer lip 26 of brake shoe table 14. An inner wedge 78 is provided on inner edge 72 and spaced from outer wedge 76. Inner wedge 78 engages inner edge 64 of gripper 30.

A window 82 is defined in brake shoe table 14. Window 82 may be used during removal of the brake lining segments, as described in detail below. A window cover 84 may be provided on gripper 30. An extension 86 of outer stop 52 may be provided on window cover 84.

Details of a preferred embodiment of the manner in which gripper 30 retains second brake lining segment 42, for example, is explained in greater detail in the discussion of FIG. 4 below.

A brake shoe web 90 provides a frame work, typically arcuate in configuration, on which brake shoe table 14 is disposed.

A female connector or anchor 92 can be provided at one end of brake shoe web 90, female connector 92 being configured for receiving an anchor pin 94. Anchor pin 94 includes a handle 98 configured for being pulled by the user of my invention. A strap 102 is provided extending from anchor pin 94 and may be provided with a bore 104 extending therethrough. An aperture 106, which is typically threaded, is spaced from female connector 92 and substantially aligned with bore 104. A fastener, such as a bolt 108, extends through bore 104 and engages threaded aperture 106 for retaining anchor pin 94 in place within female connector 92.

A pair of free ends 110 and 112 are provided on brake shoe web 90. As can be appreciated from FIGS. 1 and 2, free ends 110 and 112 allow for greater counterclockwise rotation of upper brake shoe web 90 about a pivot connection or anchor 114 when anchor pin 94 has been removed, as best appreciated from viewing FIG. 2, and as described further under OPERATION below.

A spring 118 normally biases upper and lower brake shoe webs 90 toward each other; i.e., spring 118 exerts a force pulling upper and lower brake shoe tables 14 toward each other and away from inner braking surface 122 of drum D owing to the biased rotation of brake shoe webs 90 about respective anchor pins 94.

Figure 4:
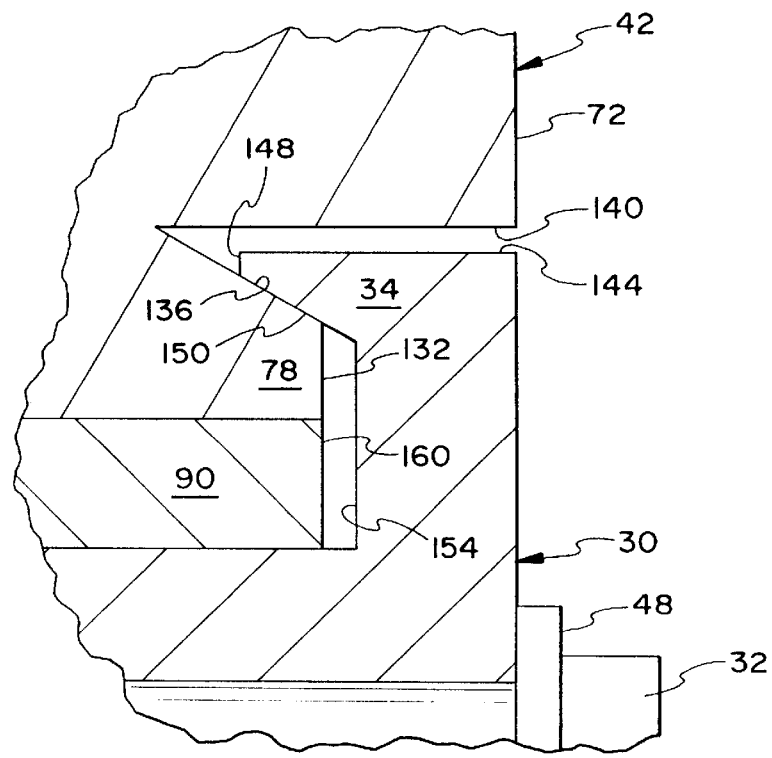
FIG. 4 is an enlarged view of a portion of a brake lining and gripper according to the invention, as shown in FIG. 3.

FIG. 4 illustrates, on an enlarged scale, the manner in which inner lip 34 of gripper 30 engages the corresponding inner wedge 78 of second brake lining segment 42.

Inner wedge 78 includes an exterior face 132. An angled upper face 136 is likewise defined on inner wedge 78.

A gap-defining face 140 of second brake lining segment 42 is spaced opposed from a counterpart gap-defining face 144 of gripper 30. Gripper 30 can likewise be provided with a truncated face 148. An angled face 150 defined on gripper 30 may be configured for mating with angled upper face 136 of inner wedge 78. An interior inner face 154 is provided on gripper 30.

An exterior face 160 is provided on brake shoe web 90.

As will be readily appreciated from viewing FIG. 4, along with the remaining figures, the configuration of gripper 30 is preferably such that substantially only compressive forces are exerted on the gripped first and second brake lining segments 40 and 42, for example, when in use. Thus, inner lip 34 is configured for ensuring that a gap will be maintained between gap-defining face 140 and gap-defining face 144. In that manner, substantially only compressive forces will be exerted by angled face 150 on angled upper face 136, and gap-defining face 144 will be prevented from engaging gap-defining face 140, so that inner wedge 78 will never be forced away from gap-defining face 140, which forcing away could lead to a breaking off of inner wedge 42. This can be further appreciated by considering that, even given standard manufacturing tolerances, the pieces are configured so that exterior face 132 will abut interior inner face 154 and, hence, will prevent further outward movement of inner lip 34 (i.e., to the left as viewed in FIG. 4) when bolt 32 is tightened down, whereby gap-defining face 144 is prevented from engaging gap-defining face 140.

Good results have been achieved by providing orientation symbols on the individual brake lining segments 40, 42, 44 and 46.

Although each of the four depicted brake lining segments, such as brake lining segment 40, is tapered from its leading edge to its trailing edge, and can be mated with its adjoining brake lining segment by observing the relative widths of abutting edges, it is preferable that such orientation symbols, which may include the configuration of the adjacent leading and trailing edges of respective brake lining segments, color coding, numbers, other symbols, and the like, be provided.

A trailing edge 180 of brake lining segment 40 has a narrower width than leading edge 182 thereof. Trailing edge 184 of adjacent, second brake lining segment 42 has substantially the same width as leading edge 182 and is positioned adjacent thereto when in use.

Leading edge 188 of second brake lining segment 42 can be configured substantially as a mirror image of trailing edge 192 of adjacent third brake lining segment 44. Similarly, leading edge 194 of third brake lining segment 44 has generally the same configuration as trailing edge 198 of fourth brake lining segment 46.

A leading edge 204 of gripper 30 is disposed adjacent a trailing edge 208 of gripper 31 when in use.

An orientation symbol 214 may be provided at leading edge 204 of gripper 30.

Preferably, an orientation symbol 218 which is so related to orientation symbol 214 that a user readily appreciates the relationship therebetween, is provided on trailing edge 208 of gripper 31. For example, orientation symbol 204 may comprise a patch of red paint, orientation symbol 218 may comprise a like patch of red paint, and a user will readily grasp that the two red paint patches 214 and 218 are intended to be disposed adjacent each other.

Likewise, an orientation symbol 222 on leading edge 188 of second brake lining element 42 will be made such that the user logically associates it with orientation symbol 224 of trailing edge 192 of third brake lining segment 44. Preferably, orientation symbol 222 is a patch of red colorant, as is orientation symbol 224, and both such orientation symbols match the red patch of orientation symbols 214 and 218.

It is likewise contemplated that a further orientation symbol 244 be provided on a face of brake shoe web 90, so that the user will readily recognize the intended final disposition and location of the brake lining segments, inasmuch as orientation symbols 256 and 258 will have logically matching meanings, such as having the same color as orientation symbol 244.

Figure 3:
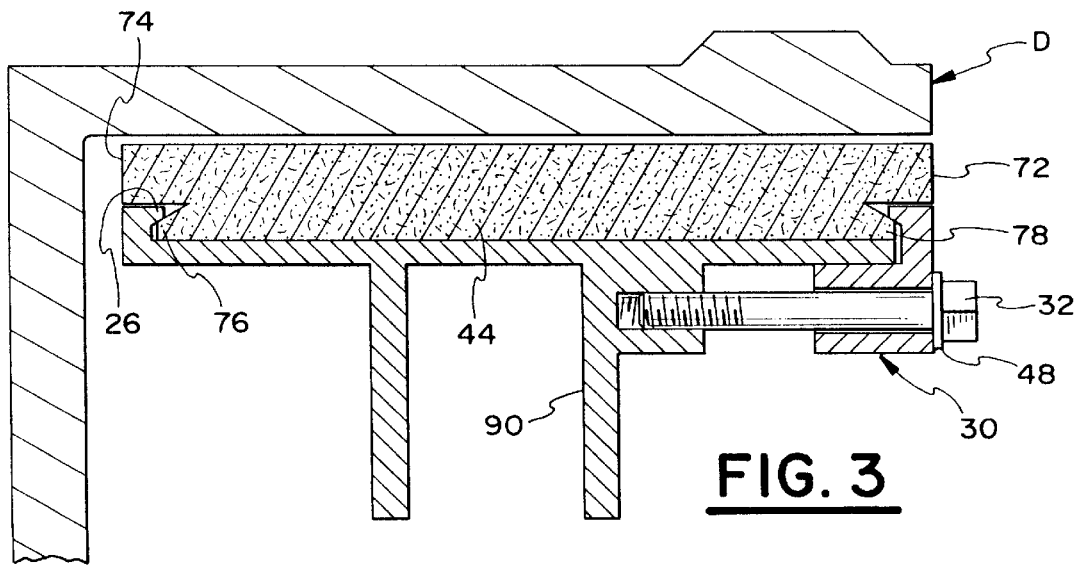
FIG. 3 is a partial cross sectional view taken along line 3—3 of FIG. 2.
Figure 5:
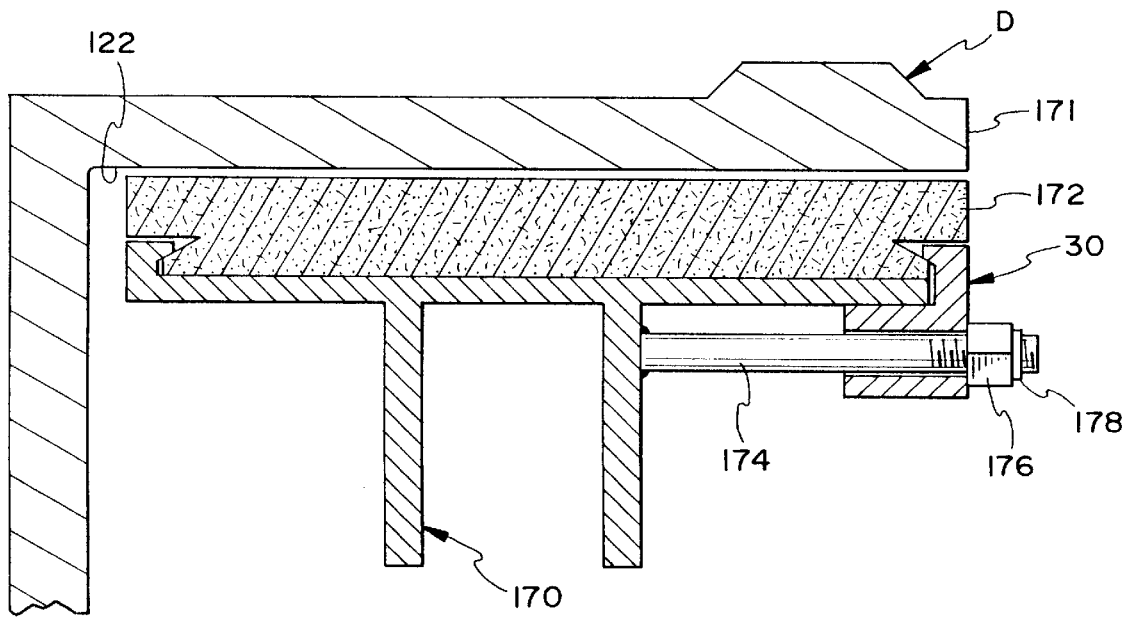
FIG. 5 is a view similar to FIG. 3, of another preferred embodiment of the invention.

FIG. 5 illustrates, in a figure similar to FIG. 3, another preferred embodiment of my invention.

Preferably, a free inner edge 171 of brake drum D will be aligned with a respective free inner edge 172 of each of first through fourth brake lining segments 40, 42, 44 and 46 when in use. Such substantial alignment of free edge 172 with free edge 171 ensures consistent wear of braking surface 122, thereby avoiding the problem of brake lining segments wearing a groove in the face of braking surface 122.

A brake shoe web 170 has a threaded fastener 174 extending therefrom. Gripper 30 is detachably attached by use of a self-locking nut 176, which may have a plastic insert 178 for eliminating the need for a lock washer, as is well known. Locking nut 176 eliminates the need for strap lock 48 of my other preferred embodiment of the invention. Of course, under certain use conditions it may be desirable to use strap lock 48 in conjunction with self-locking nut 176.

This preferred embodiment of my invention has the added advantage of further reducing the weight of my overall braking system. Such weight reduction is desirable, as every increment of reduced weight translates into lower fuel costs for the operator, and added revenue thanks to the ability to transport more cargo.

Figure 6:
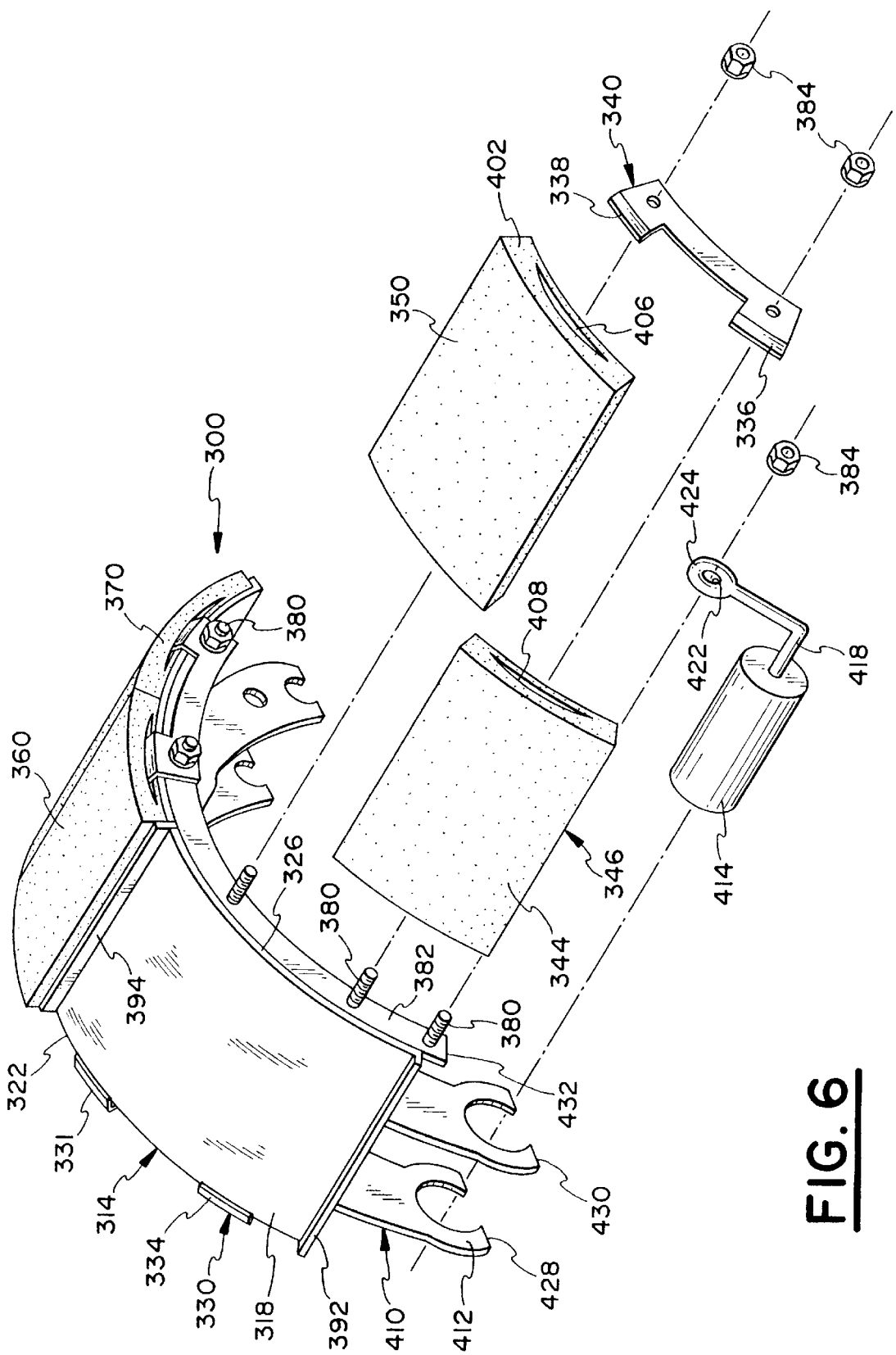
FIG. 6 is an exploded perspective view, similar to FIG. 1, of a further preferred embodiment of an arcuate brake lining apparatus according to the invention.
Figure 7:
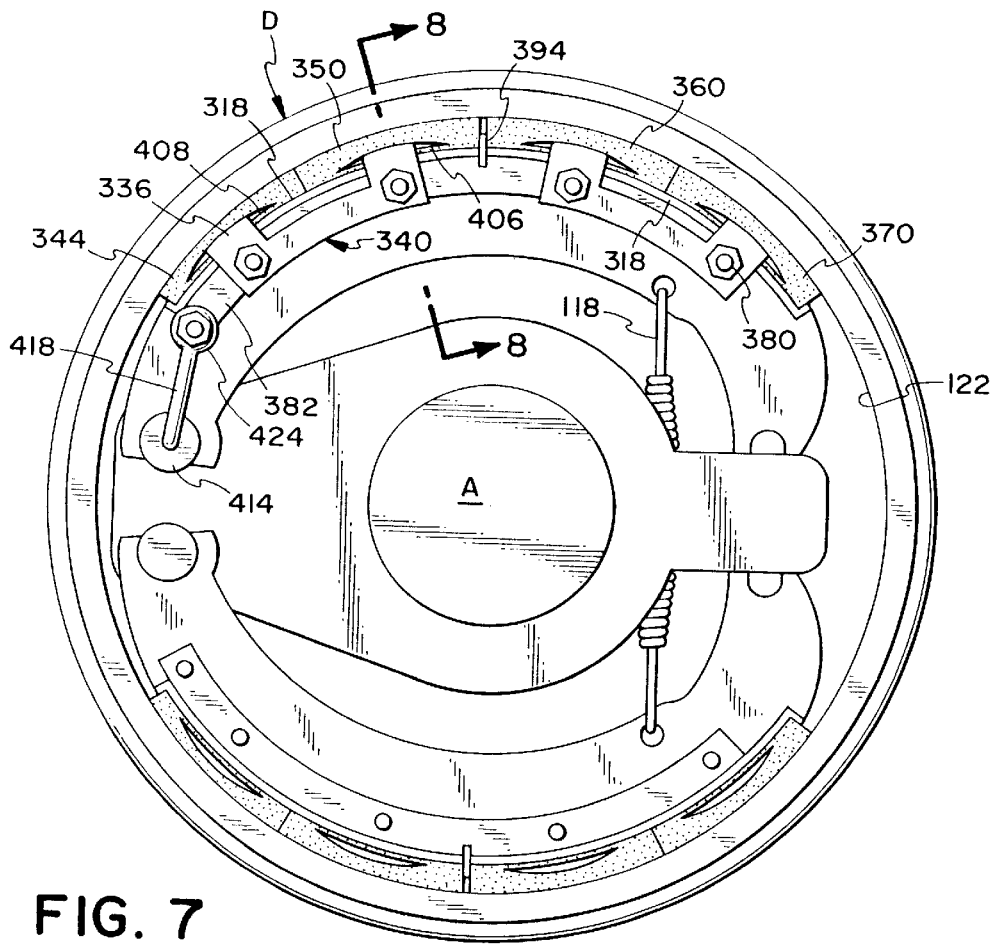
FIG. 7 is a side elevational view, similar to FIG. 2, of the further preferred embodiment of FIG. 6.
Figure 8:
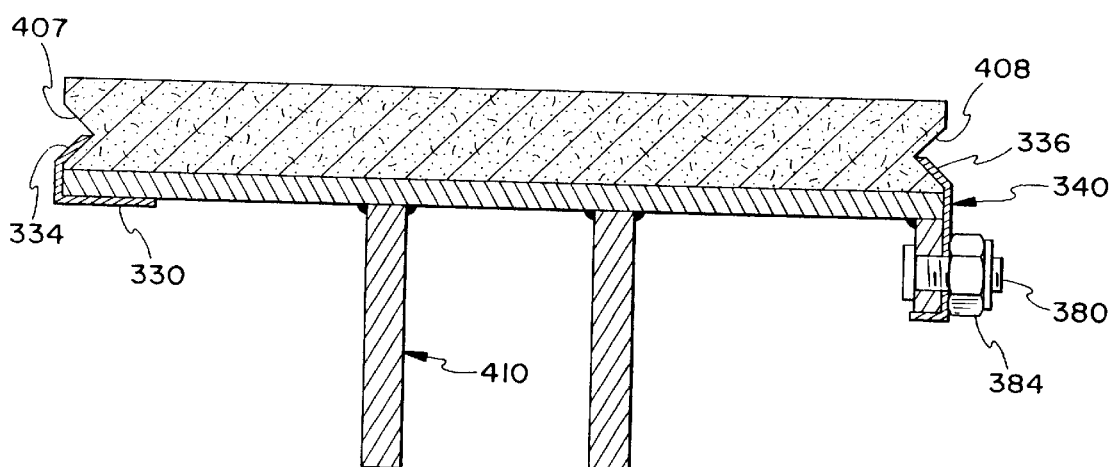
FIG. 8 is a partial cross sectional view taken along line 8—8 of FIG. 7, of the further preferred embodiment of FIG. 6.

FIGS. 6–8 illustrate a further preferred embodiment of an arcuate brake lining apparatus 300 according to the invention. Arcuate brake lining apparatus 300 is particularly suited for use with arcuate brake drums. This embodiment has fewer moving parts, fewer parts in total, and an even simpler construction than the embodiments of FIGS. 1–5.

Brake lining apparatus 300 includes a brake shoe table 314 having a lining table top 318 thereon. Lining table top 318 includes an outer edge 322 and an inner edge 326. The terms "inner" and "outer" are simply for convenience, are not intended to be limiting, and can be understood to refer to the disposition of brake lining apparatus 300 with respect to the center line of a vehicle on which the brake lining apparatus 300 is located when in use.

One or more grippers 330 and 331 are attached to brake shoe table 314. Gripper 330 may include lip 334 for use in cooperation with a lip 336 of a floating gripper 340, as will become more apparent below.

A braking surface 344 is provided on a first brake lining segment 346 in order to establish the desired braking force when in use adjacent the inner braking surface 122 of brake drum D.

It is likewise contemplated that a plurality of brake lining segments be provided, such as a second brake lining segment 350, a third brake lining segment 360, and a fourth brake lining segment 370.

Threaded studs 380 extend from a gripper bar 382 disposed on brake shoe table 314. Good results have been achieved when studs 380 are welded to table 314 and locking nuts 384 secure respective floating grippers 340 thereto.

An outer stop 392 and an inner stop 394 are provided adjacent upper surface 318 of brake shoe table 314. In this embodiment, a second inner stop may be omitted.

An inner edge 402 of second brake lining segment 350, for example, preferably includes a pocket 406 configured for engaging lip 338 of floating gripper 340. An outer edge of second brake lining segment 350 may be provided with a similar pocket which engages the lip of gripper 331.

Details of the manner in which floating gripper 340 retains first brake lining segment 346, for example, are shown in FIG. 8. First brake lining segment 346 includes an outer pocket 407 and an inner pocket 408. Pockets 406, 407, and 408 are shown as wedge-like voids. It is contemplated that other cavities which mate with respective lips 338, 334, and 336 be used.

A brake shoe web 410 provides a frame work, typically arcuate in configuration, on which brake shoe table 314 is disposed.

A female connector 414 can be provided at one end of brake shoe web 410, as in the preferred embodiment of FIGS. 1–4. Female connector 412 is configured for receiving an anchor pin 414. Anchor pin 414 includes an anchor pin lock 418 extending from anchor pin, which may be provided with a bore 422 extending therethrough at an enlarged end 424 thereof. One of threaded studs 380 extends through bore 422 and is secured by nut 384 for retaining anchor pin 414 in place within female connector 412. Enlarged end 424 may be made by flattening a portion of anchor pin lock 418, and then drilling bore 422 therethrough.

A pair of free ends 428 and 430 are provided on brake shoe web 410 as in the embodiment of FIGS. 1–4.

The stud 380 which secures anchor pin 414 may be attached to an extended portion 432 of gripper bar 382.

The structure of the embodiment of FIGS. 6–8 may be provided with elements in common with the structure and features, such as orientation symbols, of the other embodiments. One of the main features is that even fewer parts are required to achieve the same results. Furthermore, good results have been achieved when many of the components are made of stainless steel. Stainless steel avoids the problem of rust in the structural components that makes conventional systems prone to failure. The embodiment of FIGS. 6–8 may typically be made with even more weight reduction than the embodiments of FIGS. 1–4 and 5. The simplified, thinner construction of this embodiment has eliminated window 82 of the embodiment of FIGS. 1–4, for example.

As an alternative to color coding, it is contemplated that all four lining segments be made the same size and thickness. By constructing four identical brake lining segments, fabrication, packaging, and ultimate assembly by the end user is simplified. One manner of making it possible for each of brake lining segments 346, 350, 360, and 370 to be the same, is to remove more material from brake shoe web 410 in the region of brake lining segment 346 than is present in the embodiment shown in FIG. 7, so that lining table top 318 accepts a thicker brake lining segment 346. In a like manner, the disposition or configuration of lining table top 318 can be altered, as needed, so that all brake lining segments may be made the same size.

OPERATION

In use, the preferred embodiment of FIGS. 1–4 is used as follows.

Figure 2:
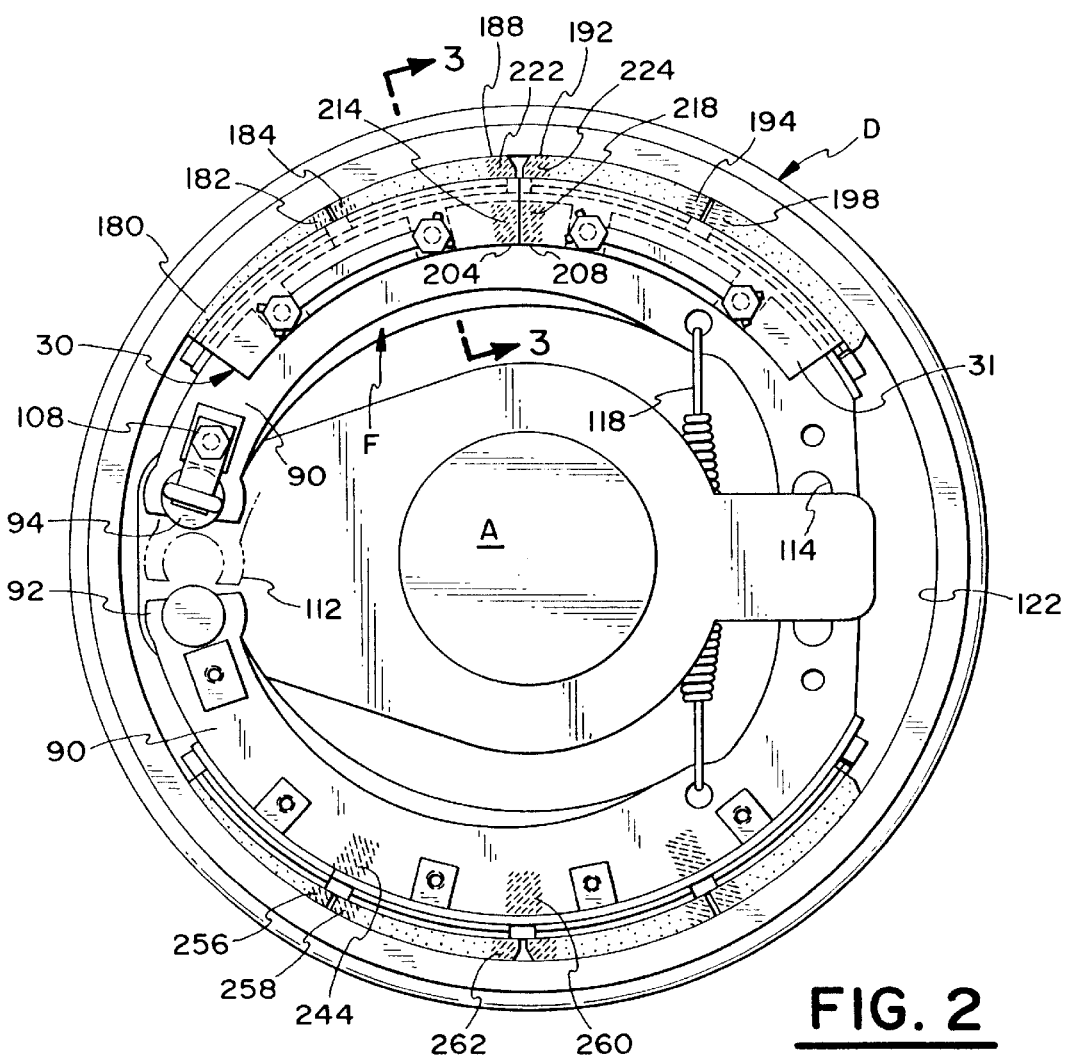
FIG. 2 is a side elevational view of respective upper and lower arcuate brake lining apparatuses mounted on a brake drum, according to the invention.

FIG. 2 illustrates a pair of installed arcuate brake lining apparatuses 10, the upper one being fully installed, and the lower one having portions thereof already removed.

To remove and replace first through fourth brake lining segments 40, 42, 44 and 46, the user first stops the vehicle, and chooses a wrench suitable for engaging bolt head 33 of bolt 32. The user simply loosens and removes the pair of bolts 32, after having bent down bendable tabs 50 out of engagement with bolt heads 33.

Gripper 30 is then disengaged from brake shoe table 14 by moving inwardly in the direction away from outer lip 26 toward inner lip 34. Window cover 84 is thus displaced and window 82 is now "open".

First brake lining segment 40 is disengaged from brake shoe table 14 by likewise moving first brake lining segment 40 inwardly away from outer lip 26. Depending on the amount of room available to maneuver first brake lining segment 40, first brake lining segment 40 is moved substantially straight inwardly, or inwardly and slightly downwardly toward axle A. In the case where additional space is desirable between braking surface 38 of brake lining segment 40 and corresponding braking surface 122 of brake drum D, the entire arcuate brake lining apparatus 10 can be rotated downwardly away from brake drum D.

The rotation of arcuate brake lining apparatus 10 is achieved by removing fastener 108, and then sliding anchor pin 94 inwardly out of engagement with female connectors 92. Brake shoe table 14 can then be rotated counterclockwise about connection 114, thanks to free ends 110 and 112 of female connectors 92, As can be appreciated from FIG. 2, free ends 110 and 112 allow brake shoe web 90 to rotate further downwardly (i.e., counterclockwise as viewed in FIG. 2) than if free ends 110 and 112 had been formed as a conventional full circle surrounding anchor pin 94. Additional free space F can be provided by removing material from a lower portion of brake shoe web 90 facing axle A and other such components, when arcuate brake lining apparatus 10 is installed.

With brake shoe table 14 rotated counterclockwise downwardly, additional space is provided between braking surface 43 of second brake lining segment 42 and inner braking surface 122 of drum D.

To remove second brake lining segment 42 in a situation requiring the initial removal of first brake lining segment 40, one proceeds as follows.

Second brake lining segment 42 is moved inwardly away from outer lip 26 a sufficient distance to free outer wedge 76 from engagement with outer lip 26.

Second brake lining segment 42 is then moved radially outwardly away from axle A a sufficient distance to be positioned further radially outwardly than the top surface of first inner stop 54. Now second brake lining segment 42 can be translated in a counterclockwise direction past first inner stop 54 to a sufficiently translated position so that second brake lining segment 42 can be moved inwardly and, hence, removed completely without hitting obstacles.

In the case where obstacles are present, or where the size of the space between braking surface 43 and braking surface 122 of drum D requires the use of window 82, the user simply translates second brake lining segment 42 a sufficient distance counterclockwise so that second brake lining segment 42 assumes the use position of first brake lining segment 40. Second brake lining segment 42 is then moved inwardly and radially downwardly through window 82 and removed.

As will be readily apparent, the removal of third brake lining segment 44 and fourth brake lining segment 46 will proceed in an analogous fashion.

The removal of first through fourth brake lining segments 40, 42, 44 and 46 from the lower brake shoe table 14 will proceed in a similar fashion.

In order to install the replacement first through fourth brake lining segments 40, 42, 44 and 46, the user proceeds in essentially a reversal of the above steps.

As will have already been noted, each one of first through fourth brake lining segments 40, 42, 44 and 46 has a configuration different from the other ones of the brake lining segments. Thus, it is important that each brake lining segment be placed in its intended position when in use. The attentive user will note that leading edge 188 of second brake lining segment 42 has substantially the same height, for example, as the trailing edge 192 of third brake lining segment 44. The similarity in heights between adjacent brake lining segments holds true for the other brake lining segments. To reduce the possibility of incorrect installation of my invention, I have provided for an assortment of orientation symbols, such as color-coding to make it very easy for a user to correctly install first through fourth brake lining segments 40, 42, 44 and 46.

Thus, for example, when installing fourth brake lining segment 46, which will be typically the first brake lining segment installed, the user will note orientation symbol 244 on web 90, which orientation symbol 244 may be the color blue, for example. The user finds fourth brake lining segment 46 which has orientation symbol 256 thereon, which would likewise be the color blue in this example. No other brake lining segment could be oriented with its orientation symbol facing inwardly and, hence, facing the user, so the user selects the fourth brake lining segment 46.

The user will notice that the next brake lining segment to be installed, third brake lining segment 44, will have the orientation symbol 258 at one edge thereof, and another orientation symbol 262 at the opposite edge thereof. Orientation symbol 258, the color blue in this example, must match the blue patch 244 on web 90, and orientation symbol 262, such as the color green, must match the green patch 260 (the orientation symbol on web 90). Other orientation symbols such as letters, numbers, and other figures are contemplated.

Grippers 30 and 31 are installed, and bolts 32 are tightened to secure them in place. Orientation symbols, such as orientation symbol 214 on gripper 30 are provided to give a visual confirmation to the user that the brake lining segments have been correctly installed. Namely, the user is reassured that the orientation symbol on the gripper 30 matches the symbol on the associated gripped brake lining segment(s).

Use of the preferred embodiment of FIGS. 6–8 is similar to the use of the other preferred embodiments.

To remove and replace the brake linings, such as brake lining segment 344, the user removes nut 384, and withdraws anchor pin 414 from female connector 412, as enlarged end 424 is freed from stud 380.

Brake lining apparatus 300 is then rotated downwardly to a moved position as in FIG. 2, so that brake lining segments 346, 350, 360, and 370 may be removed. In order to remove first brake lining segment 344, for example, nuts 384 are removed, and then floating gripper 340 is removed from respective studs 380. The removal of floating grip per 340 has released the inner wall of pocket 408 from engagement with lip 336. When first brake lining 346 is moved inwardly away from brake shoe table 314, pocket 407 will be disengaged from lip 334 of gripper 330.

The remaining brake lining segments 350, 360, and 370 may be removed in a similar manner, and in a manner analogous to the removal of brake lining segments as carried out in the previous embodiments.

It can now be seen that the inventive brake lining apparatus and method of replacing a brake lining within a brake drum achieving the above objects have been realized.

In use, the invention has eliminated the need to remove the vehicle wheels or jack up the vehicle when replacing the worn out brake linings.

The inventive linings have no rivet holes, for example, to fasten the linings to the brake web; thus, in a working model of the invention, the surface area of the braking material has been increased by about 6.4 square inches, while maintaining the size of the brake linings constant. The increased area and volume of braking material has resulted in better stopping ability and longer brake lining wear and the elimination of rivet holes, for example, has eliminated the problem of dirt-filled rivet holes wearing the brake drum unevenly.

By the use of the lining table top of the embodiment of FIGS. 6–8, the size of the lining and, hence, the braking surface area can be increased even further. It is likewise contemplated that a two-part, or single lining be used in place of the illustrated 4 part lining.

As the lining comes to the edge of the brake drum, the drum does not wear such that a lip is formed. As the drum has no lip on its inner edge, there is no place for trapping dirt or water. In colder climates, when water freezes, such trapped water has led to frozen water locking conventional shoes relative to the conventional drums.

Thanks to the inventive method eliminating the need to remove the drum for changing the brake lining, no replacement of bearings, seals, and/or lubricants is necessary. Great time savings have been realized thanks to the ready replaceability of the inventive brake linings. In the working model, only a 9/16 wrench was needed for changing the brake lining segments. Untrained mechanics can easily replace the worn brake lining segments.

The invention and inventive method are "environmentally happy" because there is no loss of lubricants, owing to the fact that there is no removal of the associated vehicle wheel.

While this invention has been described as having a preferred design, it is understood that it is capable of further modifications, uses and/or adaptations of the invention following in general the principle of the invention and including such departures from the present disclosure as come within the known or customary practice in the art to which to invention pertains and as may be applied to the central features hereinbefore set forth, and fall within the scope of the invention and of the limits of the appended claims.

I claim:

1. An arcuate brake lining apparatus for use with an arcuate brake drum, comprising:

a) a brake shoe table having a radius of curvature, said brake shoe table having an inner edge and an outer edge;

b) an outer lip disposed on said outer edge of said brake shoe table;

c) a gripper detachably attached to said brake shoe table;

d) an inner lip disposed on said gripper; and, e) at least one brake lining segment, said at least one brake lining segment having a brake surface configured for engaging an arcuate brake drum, said at least one brake lining segment having an inner edge and an outer edge, said inner edge and said outer edge being disposed substantially on the perimeter of said brake lining segment, said inner edge being configured for engaging said inner lip of said gripper when said gripper is attached to said brake shoe table, said outer edge of said at least one brake lining segment being configured for engaging said outer lip of said brake shoe table when said at least one brake lining segment is moved transversely relative to said radius of curvature of said brake shoe table, and said at least one brake lining segment being configured for being detachable from said outer edge and from said brake shoe table by detaching said gripper from said brake shoe table and by moving said at least one brake lining segment transversely relative to said radius of curvature of said brake shoe table.

2. An arcuate brake lining apparatus as defined in claim 1, wherein:
   a) said brake shoe table includes an upper surface, and said at least one brake lining segment is disposed adjacent said upper surface.

3. An arcuate brake lining apparatus as defined in claim 2, wherein:
   a) a pair of spaced apart anchors is disposed on a lower portion of said brake shoe table, and said pair of anchors is spaced from said upper surface of said brake shoe table.

4. An arcuate brake lining apparatus as defined in claim 3, wherein:
   a) an anchor pin is detachably attached adjacent one of said pair of anchors.

5. An arcuate brake lining apparatus as defined in claim 4, wherein:
   a) said anchor pin and said one anchor are configured for allowing said brake shoe table to pivot about the other one of said pair of anchors when said anchor pin is detached from said one anchor.

6. An arcuate brake lining apparatus as defined in claim 1, wherein:
   a) said inner edge of said at least one brake lining segment includes a wedge for engaging said inner lip on said gripper.

7. An arcuate brake lining apparatus as defined in claim 6, wherein:
   a) said outer edge of said at least one brake lining segment includes a wedge for engaging said outer lip.

8. An arcuate brake lining apparatus as defined in claim 7, wherein:
   a) said braking surface of said at least one brake lining segment is arcuate, said braking surface is an upper face, and an arcuate lower face is spaced from said upper face.

9. An arcuate brake lining apparatus as defined in claim 1, wherein:
   a) a stop is provided on said brake shoe table, said stop is configured for engaging said at least one brake lining segment for restricting movement thereof when said at least one brake lining segment is disposed on said brake shoe table.

10. An arcuate brake lining apparatus as defined in claim 9, wherein:
   a) said at least one brake lining segment has a substantially flat edge extending transversely to said inner edge and said outer edge, said flat edge being configured for engaging said stop provided on said brake shoe table.

11. An arcuate brake lining apparatus as defined in claim 1, wherein:
   a) said gripper is completely detachable from said table.

12. An arcuate brake lining apparatus as defined in claim 1, wherein:
   a) said at least one brake lining segment includes a left and a right face disposed thereon, at least one of said left and right faces extending transversely to said radius of curvature of said brake lining segment.

13. An arcuate brake lining apparatus as defined in claim 1, wherein:
   a) each said at least one brake lining segment includes at least two brake lining segments, and each one of said at least two brake lining segments is substantially the same.

14. A brake lining element comprising:
   a) a brake lining segment having a radius of curvature and being configured for engaging an arcuate brake drum;
   b) an inner edge and an outer edge disposed on said brake lining segment, said inner and outer edges being curved;
   c) said inner edge of said brake lining segment including a wedge;
   d) at least one of said inner and outer edges being disposed substantially on a perimeter of said brake lining segment;
   e) a left face and a right face disposed on said brake lining segment, at least one of said left and right faces being substantially completely flat, at least one of said left and right faces extending transversely relative to said inner and outer edges of said brake lining segment, and at least one of said left and right faces extending transversely relative to said radius of curvature of said brake lining segment; and
   f) said brake surface being disposed on an upper face thereof.

15. A brake lining element as defined in claim 14, wherein:
   a) said wedge is substantially arcuate.

16. A brake lining element as defined in claim 14, wherein:
   a) both said left and right faces extend transversely relative to said radius of curvature of said brake lining segment and transversely relative to said inner and outer edges.

17. A brake lining element as defined in claim 14, wherein:
   a) both said left and right faces are substantially flat.

18. A brake lining element as defined in claim 14, wherein:
   a) both said left and right faces are substantially entirely flat.

19. A method of replacing an arcuate brake lining disposed within an arcuate brake drum, comprising the steps of:
   a) providing an arcuate brake lining apparatus including:
      i) a brake shoe table having a radius of curvature, said brake shoe table having an inner and an outer edge;
      ii) an outer lip disposed on said outer edge of said brake shoe table;
      iii) a gripper detachably attached to said brake shoe table;
      iv) an inner lip disposed on said gripper; and
      v) at least one brake lining segment, said at least one brake lining segment having a radius of curvature and a braking surface configured for engaging an arcuate brake drum, said at least one brake lining segment having an inner edge and an outer edge, said inner edge being configured for engaging said inner lip of said gripper when said gripper is attached to said brake shoe table, and said outer edge being configured for engaging said outer lip of said brake shoe table, and said at least one brake lining segment being removable by detaching said gripper from said brake shoe table and by moving said at least one brake lining segment transversely relative to said radius of curvature of said brake shoe table;
   b) removing said gripper from said brake shoe table; and,
   c) moving said at least one brake lining segment transversely relative to said radius of curvature and in a direction from said outer edge toward said inner edge for disengaging said outer edge from said outer lip.

20. A method of replacing an arcuate brake lining as defined in claim 19, further comprising the step of:
   a) moving a second brake lining segment of said at least one brake lining segments in a direction from said outer edge toward said inner edge for disengaging said outer edge from said outer lip.

21. A method of replacing an arcuate brake lining as defined in claim 19, wherein:
   a) said at least one brake lining segment includes a left and a right face disposed thereon, and at least one of said left and right faces extending transversely relative to said radius of curvature of said brake lining segment.

22. A method of replacing an arcuate brake lining as defined in claim 19, further comprising the step of:
   a) removing said gripper completely from said brake shoe table.

23. An arcuate brake lining apparatus for use with an arcuate brake drum, comprising:
   a) a brake shoe table having a radius of curvature, said brake shoe table having an inner edge and an outer edge;
   b) an outer lip disposed on said outer edge of said brake shoe table;
   c) a gripper detachably attached to said brake shoe table, said gripper being detachable transversely relative to said radius of curvature of said brake shoe table;
   d) an inner lip disposed on said gripper; and,
   e) at least one brake lining segment, said at least one brake lining segment having a brake surface configured for engaging an arcuate brake drum, said at least one brake lining segment having an inner edge and an outer edge, said inner edge and said outer edge being disposed substantially on the perimeter of said brake lining segment, said inner edge being configured for engaging said inner lip of said gripper when said gripper is attached transversely relative to said radius of curvature of said brake shoe table, said outer edge of said at least one brake lining segment being configured for engaging said outer lip of said brake shoe table when said at least one brake lining segment is moved transversely relative to said radius of curvature of said brake shoe table, said at least one brake lining segment having at least one substantially flat face extending transversely relative to said inner edge and disposed substantially on the perimeter of said brake lining segment, and said at least one brake lining segment being configured for being detachable from said outer edge and from said brake shoe table by detaching said gripper from said brake shoe table and by moving said at least one brake lining segment transversely relative to said radius of curvature of said brake shoe table.

24. An arcuate brake lining apparatus as defined in claim 23, wherein:
   a) a stop is provided on said brake shoe table, said stop is configured for engaging said at least one brake lining segment for restricting movement thereof when said at least one brake lining segment is disposed on said brake shoe table.

25. An arcuate brake lining apparatus as defined in claim 23, wherein:
   a) a wedge is defined in said inner edge of said at least one brake lining segment, and said wedge is configured for engaging said inner lip of said gripper.

26. An arcuate brake lining apparatus as defined in claim 23, wherein:
   a) a pocket is defined in said inner edge of said at least one brake lining segment, and said pocket is configured for engaging said inner lip of said gripper.

* * * * *